(12) United States Patent
Jonsson

(10) Patent No.: US 9,784,039 B2
(45) Date of Patent: Oct. 10, 2017

(54) DEVICE AND METHOD RELATED TO LUBRICATION OF COMPONENTS IN A ROCK DRILLING MACHINE AND ROCK DRILLING MACHINE

(71) Applicant: Atlas Copco Rock Drills AB, Orebro (SE)

(72) Inventor: Per Jonsson, Orebro (SE)

(73) Assignee: Atlas Copco Rock Drills AB, Orebro (SE)

( * ) Notice: Subject to any disclaimer, the term of this patent is extended or adjusted under 35 U.S.C. 154(b) by 150 days.

(21) Appl. No.: 14/787,847

(22) PCT Filed: Jun. 24, 2014

(86) PCT No.: PCT/SE2014/000088
§ 371 (c)(1),
(2) Date: Oct. 29, 2015

(87) PCT Pub. No.: WO2014/209197
PCT Pub. Date: Dec. 31, 2014

(65) Prior Publication Data
US 2016/0084012 A1    Mar. 24, 2016

(30) Foreign Application Priority Data
Jun. 25, 2013 (SE) ...................... 1350767

(51) Int. Cl.
*E21B 12/00* (2006.01)
*F16N 21/00* (2006.01)
(Continued)

(52) U.S. Cl.
CPC .............. *E21B 12/00* (2013.01); *E21B 4/003* (2013.01); *E21B 6/00* (2013.01); *F16N 21/00* (2013.01); *F16N 39/06* (2013.01)

(58) Field of Classification Search
CPC . E21B 12/00; E21B 4/003; E21B 6/00; F16N 21/00; F16N 39/06
See application file for complete search history.

(56) References Cited

U.S. PATENT DOCUMENTS 3,921,731 A    11/1975  Ekwall et al.
4,068,727 A     1/1978  Andersson et al.
(Continued)

FOREIGN PATENT DOCUMENTS

GB    877770     9/1961
GB   2122271     1/1984
(Continued)

*Primary Examiner* — William E Dondero
*Assistant Examiner* — Robert T Reese
(74) *Attorney, Agent, or Firm* — Mark P. Stone

(57) ABSTRACT

A device in respect of a hydraulic rock drilling machine (1) with a machine housing (2,3,11), which encloses a hydraulic percussion device, a rotation mechanism (4) for rotation driving a shank adapter (1) and a guiding device (6) for the shank adapter, wherein the rock drilling machine includes at least one supply channel for lubricant to said components intended for lubrication, and at least one outlet channel (5,7) for used lubricant. Said at least one outlet channel (5,7) is connected to a separation chamber (8) for separating particle-shaped impurities existing in used lubricant. The separation chamber (8) has a discharge conduit (9) for treated lubricant. The invention also concerns a method and a rock drilling machine.

20 Claims, 3 Drawing Sheets

(51) Int. Cl.
*F16N 39/06* (2006.01)
*E21B 4/00* (2006.01)
*E21B 6/00* (2006.01)

(56) References Cited

U.S. PATENT DOCUMENTS

| | | | |
|---|---|---|---|
| 4,243,110 A | | 1/1981 | Clemenson et al. |
| 5,060,761 A | | 10/1991 | Arndt et al. |
| 5,476,582 A | * | 12/1995 | Camping ............... B01D 35/06 |
| | | | 210/167.03 |
| 2006/0048957 A1 | | 3/2006 | Oksman |
| 2011/0011647 A1 | | 1/2011 | Mantyniemi et al. |

FOREIGN PATENT DOCUMENTS

| | | |
|---|---|---|
| GB | 2 148 776 | 6/1985 |
| GB | 2157219 | 10/1985 |
| WO | WO 2009/112637 | 9/2009 |
| WO | WO 2011/092377 | 8/2011 |

* cited by examiner

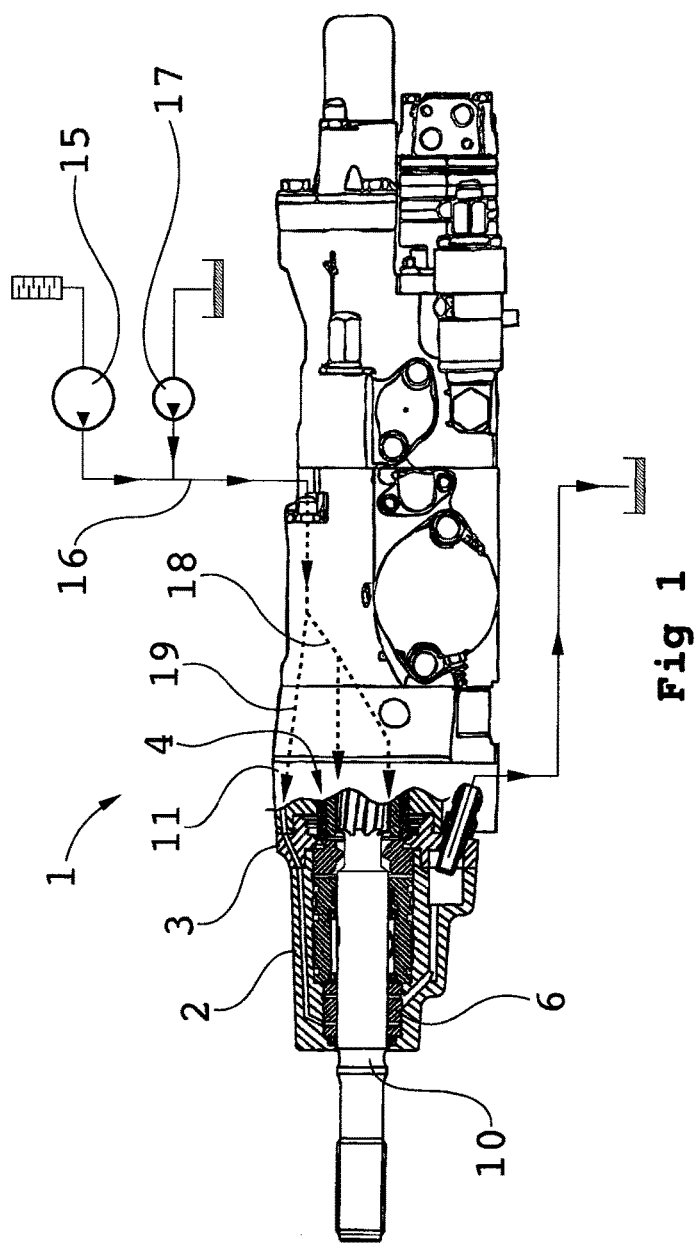
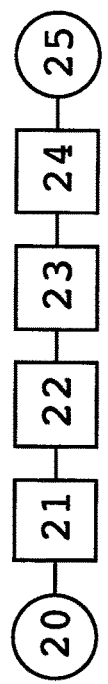
Fig 1
Fig 3

DEVICE AND METHOD RELATED TO LUBRICATION OF COMPONENTS IN A ROCK DRILLING MACHINE AND ROCK DRILLING MACHINE

FIELD OF THE INVENTION

The invention concerns a device in respect of a hydraulic rock drilling machine with a machine housing, which encloses a hydraulic percussion device, a rotation mechanism for rotation driving a shank adapter and a guiding device for the shank adapter, being arranged in the machine housing, wherein the rock drilling machine includes: at least one supply channel for lubricant to components in the rock drilling machines being intended for lubrication, and at least one outlet channel for used lubricant. The invention also concerns a rock drilling machine and a method.

DESCRIPTION OF THE BACKGROUND ART

Hydraulic rock drilling machines are previously known wherein movable components, that during operation are not in contact with the hydraulic flow for driving the rock drilling machine, are provided with lubrication by way of a small flow of lubricant being transported to said moveable component being subject to lubrication by pressurized air.

In previous rock drilling machines, used lubricant has simply been allowed to follow the pressurized air stream directly to the surroundings which results in an environmental load and problems for persons being in proximity to such rock drilling machines when in operation. According to more recent requirements for an improved working environment, load on the surroundings etc., used lubricant must, however, be collected and taken care of.

This has typically been made by connecting a hose to the machine housing for re-conducting the used lubricant to a collecting vessel.

As an example of the background art can be mentioned U.S. Pat. No. 3,921,731.

AIM AND MOST IMPORTANT FEATURES OF THE INVENTION

It is an aim of the present invention to provide an improved device according to the above which provides improved operational reliability for devices of the kind mentioned above.

This aim is obtained in respect of a device as initially described in that said at least one outlet channel is connected to a separation chamber being arranged in the region of the machine housing for separating particle-shaped impurities existing in used lubricant, and that the separation chamber is connected to a discharge conduit for used lubricant treated therein.

By providing a separation chamber already in the region of the machine housing for separating impurities, it is achieved that the ability of the oil to flow in the discharge conduit is improved and that the amount of particles that might cause plugging in the discharge conduit, otherwise being exposed to plugging, which in turn could lead to functional problems for the rock drilling machine, is reduced in a simple and effective way.

On its way through the rock drilling machine, the lubrication oil carries impurities in the form of wear products such as metal shavings etc. Further there are frequently coke particles present in the used lubrication oil, coming from parts of the rock drilling machines wherein high heat is generated and wherein local heating of the oil thereby coke production can occur. Impurities of this kind has unfortunately proved to have potential to adhere in return hoses and thereby create the above problems with plugging, impaired flow etc.

It should be noted that it is of a great importance for the lubrication function that used lubricant does not meet any appreciable flow resistant on its way to the collecting place since that could result in impaired lubricant flow in regions of components to be lubricated.

It is of great importance, according to the invention, that the separation chamber is positioned as close to the source of said impurities as possible so that plugging and accumulation of impurities in the discharge channel upstream of the separation chamber is minimized. The feature "separation chamber arranged in the region of the machine housing" thus in principle means that the separation chamber is arranged in direct vicinity of the lubrication position or positions in order to avoid accumulation of impurities in conduit portions upstream of the separation chamber.

Downstream of the separation chamber, the used lubricant, separated from impurities and thereby with enhanced flow properties, is advantageously passed on through the discharge conduit to a collecting vessel.

By said discharge conduit emanating from a pipe portion, which is protruding inwards into the separation chamber, and which provides a free end inside the separation chamber, it is achieved a prolonged flow path for the lubricant typically flowing along wall regions of the separation chamber and the inwards protruding pipe portion. Hereby are achieved increased possibilities of separating impurities inside the separation chamber.

It is preferred that the separation chamber includes at least one collecting pocket in an area surrounding a connection of said discharge conduit in the separation chamber. Such a collecting pocket can be comprised of a constricted, annular region of the separation chamber surrounding the inwards protruding pipe portion.

It is further preferred that, as seen in the general flow direction of used lubricant, an area of a section of the separation chamber amounts to 3-20 times and more preferred 7-15 times an area of a section of the discharge conduit.

Suitably an outlet channel emanates from the rotation mechanism which is normally the greatest source of impurities, and preferably an outlet channel also emanates from the guiding device.

The separation chamber is preferably arranged in the machine housing, whereby no additional components have to add to the rock drilling machine. It is hereby highly preferred that the separation chamber is arranged in connection to a dividing section in the machine housing in order to be openable when dividing the machine housing along said dividing section. This way the separation chamber can be arranged such that it is naturally accessible and can be cleaned during the planned regular service occasions for the rock drilling machine.

Alternatively, the separation chamber is arranged outside the machine housing, which for example is an option in order to equip existing rock drilling machines afterwards or for rock drilling machines where inside the machine housing there is lack of space for an integral built-in separation chamber.

The invention also relates to a rock drilling machine including a device according to the above, wherein the corresponding advantages are obtained.

In an inventive method for lubricant handling in a hydraulic rock drilling machine with a machine housing, which encloses a hydraulic percussion device, a rotation mechanism for rotation driving a shank adapter and a guiding device for the shank adapter, being arranged in the machine housing, wherein the method includes: pressurized air driving lubricant to components in the rock drilling machines being intended for lubrication over at least one supply channel, and discharging used lubricant over at least one outlet channel. Used lubricant is led, according to the invention, to a separation chamber being arranged in the region of the machine housing for separating particle-shaped impurities existing in used lubricant, and used lubricant treated in the separation chamber is discharged over a discharge conduit away from the separation chamber.

Particle-shaped impurities are collected in at least one collecting pocket in an area surrounding a connection of said discharge conduit in the separation chamber.

Used lubricant is typically led to the separation chamber from the rotation mechanism and preferably also from the guiding device.

Further features of the invention will be explained in the below detailed description.

BRIEF DESCRIPTION OF DRAWINGS

The invention will now be described in greater detail by way of embodiments and with reference to the annexed drawings, wherein:

FIG. 1 shows a partial axial section through a hydraulic rock drilling machine,

FIG. 2A illustrates a second embodiment of the invention. FIG. 2A is similar to FIG. 2, except that the separation chamber 8, which is illustrated as being inside the machine housing in FIG. 2, is illustrated as being outside of the machine housing in FIG. 2A. The same reference numerals used in FIG. 2 have been used in FIG. 2A to designate corresponding structure.

FIG. 3 shows a diagrammatic block diagram of a sequence of a method according to the invention.

DESCRIPTION OF EMBODIMENTS

Figure 2:
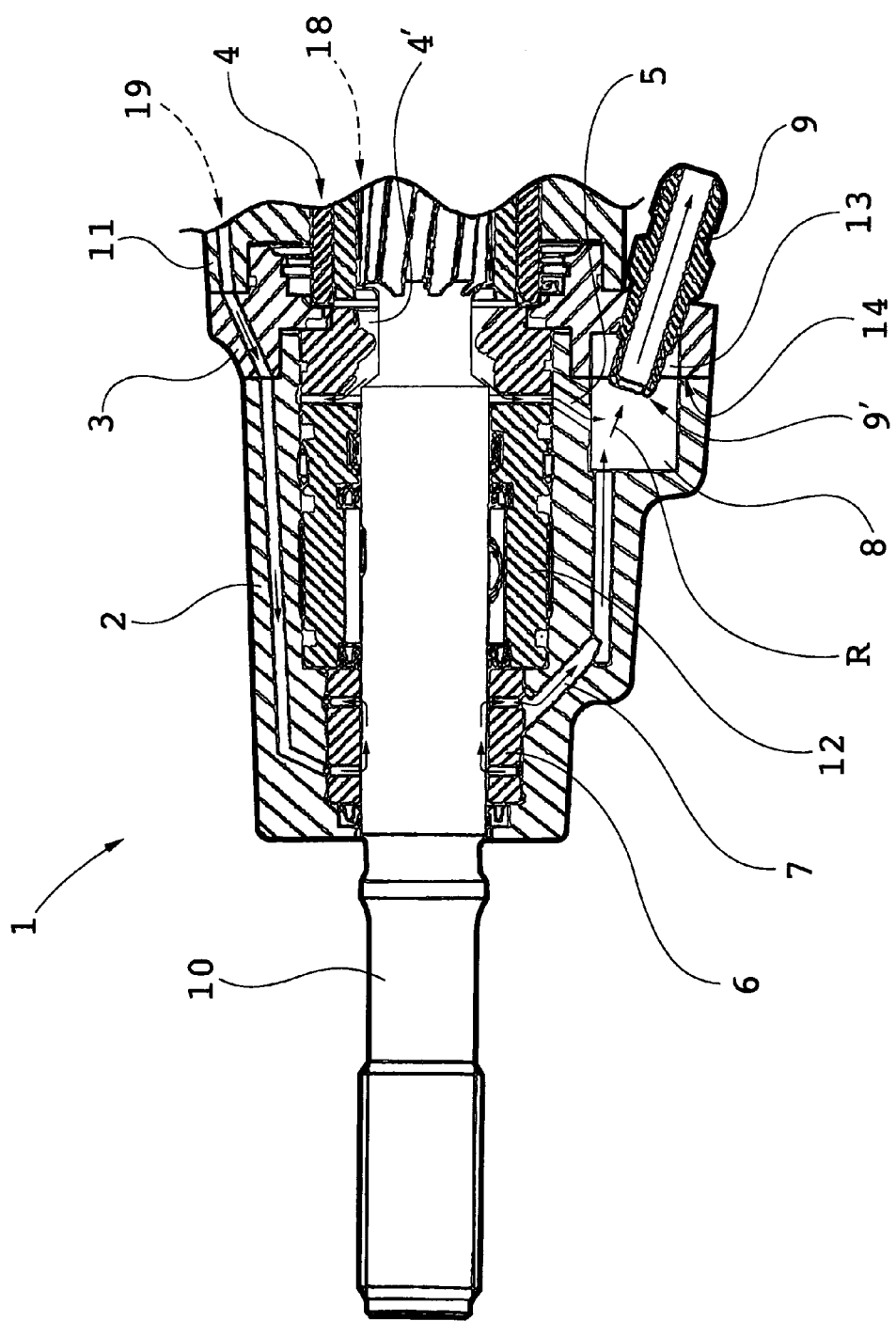
FIG. 2 shows an axial section in greater scale through a portion of the rock drilling machine in FIG. 1.

A hydraulic rock drilling machine 1 shown in FIG. 1 includes a machine housing, whereof a front part is indicated with 2, an intermediate part with 3 and a rear part with 11. The machine housing includes a (not shown) hydraulic percussion device, a rotation mechanism 4 and a guiding device 6 in the form of a front bushing for guiding a shank adapter 10. A flush liquid swivel 12 is arranged inside the front part.

In operation of the hydraulic rock drilling machine 1, there is provided for lubrication of movable components which are not in contact with the driving flow to the not shown percussion device through a pressurized air drive of lubricant 15, 16, 17, which in a per se known manner is connected to coupling means arranged on the rock drilling machine and at least one supply channel for the lubricant to said components intended for lubrication. In particular, a pressurized fluid source is indicated with 15, a lubricant conduit with 16 and a lubricant source with 17. Supply channels 18 for the lubricant to the rotation mechanism and supply channels 19 for the lubricant to the guiding device are of conventional kind and are only partly indicated on FIG. 1.

As an example only can be mentioned that the amount of supplied lubricant typically is around 2 cm$^3$/min at an air flow of about 400 l/min for a midsized rock drilling machine for blast hole drilling. Other values can of course come into question for different sizes and types of rock drilling machines.

With continued reference to FIG. 2, after completed lubricating action, used lubricant is passed on from the rotation mechanism 4 and the follower compartment 4' over a first outlet channel 5 to a separation chamber 8. Lubricant being used for lubrication in the region of the front bushing 6 is lead over a second outlet channel 7 to the separation chamber 8.

The separation chamber 8 also comprises a discharge portion wherein is situated an inwards protruding pipe portion 9 of a discharge conduit, the free end 9' of which protrudes a portion inside the separation chamber for forming a space 13 surrounding this inwards protruding pipe portion 9, wherein said space 13 forms a collecting pocket in order to increase the ability of the separation chamber to separate and retain impurities such as metal particles and coke particles. In a flow direction of used lubricant as well as flowing carrier gas in the form of remaining pressurized air, the separation chamber 8 exhibits a cross section area that a plural times exceeds the cross section of the respective outlet channel 5,7 and the cross section of said pipe portion of the discharge conduit 9.

This way a flow speed of carrier gas or pressurized air and used lubricant will be low in the separation chamber 8 resulting in greater separation efficiency. Typically, used lubricant, after having been introduced by the outlet channels 5; 7 into the separation chamber, to move along the surfaces of the separation chamber 8 where the flow speed thus will be essentially lower than the flow speed in the outlet channels 5, 7 and in the discharge conduit.

By providing said inwards protruding pipe portion to the discharge conduit 9, the tendency of existing impurities in the used lubricant to reach all the way to the discharge conduit itself will be further reduced.

As a supplement to the separation chamber 8 and the inwards protruding pipe portion 9 respectively can be provided on one or more transverse flanges on the inwards protruding pipe portion 9 in order to increase the movement path for lubricant all the way to a mouth of said protruding pipe portion 9. Further or instead, other path-length extending elements can be arranged in the separation chamber itself as well as on the inwards protruding pipe portion 9.

A dividing section between the front part 2 and intermediate part 3 of the machine housing is indicated with 14. Through this dividing section, the machine housing can be divided by separating the front part 2 and the intermediate part 3 for service, exchange of components such as seals etc. By extending the dividing section 14 such that it passes the separation chamber 8, service and cleaning of the separation chamber 8 is facilitated such that such cleaning can be made regularly, for example in connection with exchange of seals.

A method sequence is illustrated in FIG. 3, wherein position 20 indicates the start of the sequence,
position 21 indicates pressurized air driving lubricant to components of the rock drilling machine intended for lubrication,
position 22 indicates transporting away used lubricant over at least one outlet channel, position 23 indicates that used lubricant is led to a separation chamber being positioned in the region of the machine housing for separation of particle-shaped impurities existing in used lubricant, position 24 indicates that treated used lubricant over a discharge conduit is led away from the separation chamber, and position 25 indicates the end of the sequence.

The invention can be varied and modified within the scope of the following claims and, for example, the separation chamber can be a vessel being arranged separately outside the machine housing even if the embodiment shown in FIGS. 1 and 2 with a separation chamber being built-in into the machine housing is preferred.

The separation chamber 8 can be provided in different shapes such as cylindrical, part spherical and also box shaped. It can also be given another shape that offers itself in order to be effectively integrated into or adapted to the machine housing.

A number of outlet channels can lead to the separation chamber 8, but in its simplest form, one single first outlet channel 5 leads to the separation chamber 8 in order to handle the impurities that are normally the greatest in this connection, which are the one been formed at the follower and in the rotation mechanism. In that case it is not excluded that used lubricant from the front bushing 6 is led to the surroundings or possible be led to a collecting unit without passing the separation chamber 8.

The invention claimed is:

1. Device in respect of a hydraulic rock drilling machine (1) with a machine housing (2,3,11), which encloses a hydraulic percussion device, a rotation mechanism (4) for rotation driving a shank adapter (10) and a guiding device (6) for the shank adapter, being arranged in the machine housing, wherein the rock drilling machine includes:
at least one supply channel for lubricant to components in the rock drilling machines being intended for lubrication, and
at least one outlet channel (5,7) for used lubricant, wherein
said at least one outlet channel (5,7) is connected to a separation chamber (8) being arranged in the region of the machine housing for separating particle-shaped impurities existing in used lubricant, and
the separation chamber (8) is connected to a discharge conduit (9) for used lubricant treated therein.

2. Device according to claim 1, wherein said discharge conduit (9) emanates from a pipe portion, which is protruding inwards into the separation chamber (8), which provides a free end (9') inside the separation chamber (8).

3. Device according to claim 2, wherein the separation chamber (8) includes at least one collecting pocket (13) in an area surrounding a connection of said discharge conduit (9) in the separation chamber (8).

4. Device according to claim 2, wherein, as seen in a flow direction (R) for used lubricant, an area of a section of the separation chamber (8) amounts to 3-20 times and more preferred 7-15 times an area of a section of the discharge conduit (9).

5. Device according to claim 1, wherein the separation chamber (8) includes at least one collecting pocket (13) in an area surrounding a connection of said discharge conduit (9) in the separation chamber (8).

6. Device according to claim 5, wherein, as seen in a flow direction (R) for used lubricant, an area of a section of the separation chamber (8) amounts to 3-20 times and more preferred 7-15 times an area of a section of the discharge conduit (9).

7. Device according to claim 1, wherein, as seen in a flow direction (R) for used lubricant, an area of a section of the separation chamber (8) amounts to 3-20 times and more preferred 7-15 times an area of a section of the discharge conduit (9).

8. Device according to claim 1, wherein an outlet channel (5) emanates from the rotation mechanism (4).

9. Device according to claim 1, wherein an outlet channel (7) emanates from the guiding device (6).

10. Device according to claim 1, wherein the separation chamber (8) is arranged in the machine housing (2,3,11).

11. Device according to claim 10, wherein the separation chamber (8) is arranged in connection to a dividing section (14) in the machine housing in order to be openable when dividing the machine housing along said dividing section.

12. Device according to claim 1, wherein the separation chamber is arranged outside the machine housing.

13. Rock drilling machine including a device according to claim 1.

14. Method for lubricant handling in a hydraulic rock drilling machine (1) with a machine housing (2,3,11), which encloses a hydraulic percussion device, a rotation mechanism (4) for rotation driving a shank adapter (10) and a guiding device (6) for the shank adapter, being arranged in the machine housing, wherein the method includes:
pressurized air driving lubricant to components in the rock drilling machines being intended for lubrication over at least one supply channel, and
discharging used lubricant over at least one outlet channel (5,7),
wherein:
used lubricant is led to a separation chamber (8) being arranged in the region of the machine housing (1) for separating particle-shaped impurities existing in used lubricant, and
used lubricant treated in the separation chamber (8) is discharged over a discharge conduit (9).

15. Method according to claim 14, wherein said particle-shaped impurities are collected in at least one collecting pocket (13) in an area surrounding a connection of said discharge conduit (9) in the separation chamber (8).

16. Method according to claim 15, wherein used lubricant is led to the separation chamber (8) from the rotation mechanism (4).

17. Method according to claim 15, wherein used lubricant is led to the separation chamber (8) from the guiding device (6).

18. Method according to claim 14, wherein used lubricant is led to the separation chamber (8) from the rotation mechanism (4).

19. Method according to claim 18, wherein used lubricant is led to the separation chamber (8) from the guiding device (6).

20. Method according to claim 14, wherein used lubricant is led to the separation chamber (8) from the guiding device (6).

* * * * *

UNITED STATES PATENT AND TRADEMARK OFFICE
CERTIFICATE OF CORRECTION

PATENT NO. : 9,784,039 B2
APPLICATION NO. : 14/787847
DATED : October 10, 2017
INVENTOR(S) : Per Jonsson It is certified that error appears in the above-identified patent and that said Letters Patent is hereby corrected as shown below:

In the Specification

Column 3: Delete Lines 37-43.

Figure 2A:
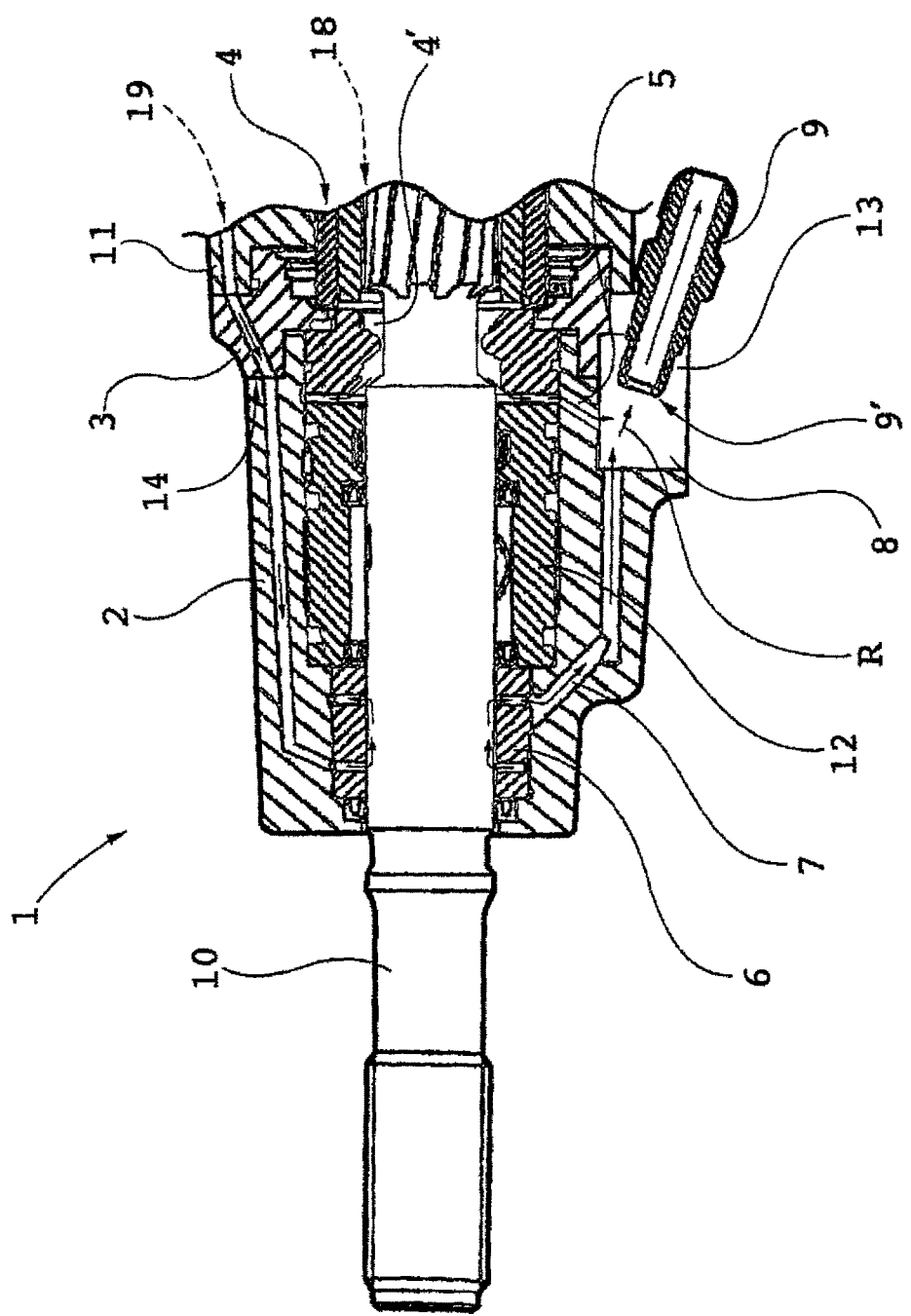
FIG. 2A is similar to FIG. 2 and illustrates a second embodiment of the present invention.

Column 4, below Line 60: Add the following paragraph:
--Fig. 2A illustrates a second embodiment of the invention. Fig. 2A is similar to Fig. 2, except that the separation chamber 8, which is illustrated as being inside the machine housing in Fig. 2, is illustrated as being outside of the machine housing in Fig. 2A. The same reference numerals used in Fig. 2 have been used in Fig. 2A to designate corresponding structure.--.

Signed and Sealed this
Fourteenth Day of November, 2017

Joseph Matal
*Performing the Functions and Duties of the
Under Secretary of Commerce for Intellectual Property and
Director of the United States Patent and Trademark Office*